United States Patent
Bonin

(10) Patent No.: US 6,369,477 B1
(45) Date of Patent: Apr. 9, 2002

(54) ROLLER-TYPE ELECTRIC MOTOR

(75) Inventor: Richard L. Bonin, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/682,876

(22) Filed: Jul. 31, 1996

(51) Int. Cl.[7] .................... H02K 7/10; H02K 37/00; H02K 1/06
(52) U.S. Cl. ................ 310/156.01; 310/82; 310/49 R; 310/266; 310/267
(58) Field of Search ................ 310/82, 80, 156, 310/49 R, 266, 267, 40.5, 81

(56) References Cited

U.S. PATENT DOCUMENTS

| | | | | |
|---|---|---|---|---|
| 3,452,227 A | * | 6/1969 | Welch | 310/82 |
| 3,456,139 A | * | 7/1969 | Newell | 310/82 |
| 3,561,834 A | * | 2/1971 | Durand | 310/82 |
| 4,329,607 A | * | 5/1982 | Rosain et al. | 310/82 |
| 5,030,866 A | * | 7/1991 | Kawai | 310/82 |
| 5,252,870 A | * | 10/1993 | Jacobsen et al. | 310/82 |
| 5,331,245 A | * | 7/1994 | Burgbacher et al. | 310/186 |
| 5,545,943 A | * | 8/1996 | Satake et al. | 310/350 |

* cited by examiner

Primary Examiner—Burton S. Mullins
(74) Attorney, Agent, or Firm—Michael J. McGowan; Prithvi C. Lall; Michael F. Oglo

(57) ABSTRACT

A roller-type electric motor includes a housing having a hollow interior and an inner wall. A plurality of stator poles each of predetermined magnetic polarity are positioned at the inner wall of the housing, and a roller having an outer surface is positioned for rolling movement within said hollow interior of the housing. A plurality of roller poles each of predetermined magnetic polarity are positioned on the outer surface of the roller so that a first one of the roller poles has a magnetic polarity opposite the magnetic polarity of a first one of the stator poles so that the first roller pole is drawn through magnetic action into contact with the first stator pole. A control device reverses the magnetic polarity of the first stator pole when the first roller pole contacts it to repel the first roller pole through magnetic action while simultaneously predetermined roller poles adjacent to the first roller pole are magnetically drawn towards predetermined stator poles adjacent to the first stator pole to impart rolling movement to the roller within the housing.

1 Claim, 5 Drawing Sheets

ROLLER-TYPE ELECTRIC MOTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to electric motors and, more particularly, to an electric motor having a construction which takes advantage of the principles of magnetic attraction and repulsion to cause the rotor of the motor to roll within the motor stator by contact and thereafter repulsion between the rotor and the stator.

(2) Description of the Prior Art

Conventional electric motors operable to convert electrical energy into mechanical energy are well known. Because of their many advantages, electric motors have largely replaced other motive power in industry, transportation, mines, business, farms and homes. Electric motors are convenient, economical to operate, inexpensive to purchase, safe, free from smoke and odor and comparatively quiet. They can meet a wide range of service requirements, such as, starting, accelerating, running, braking, holding and stopping a load. They are available in sizes from a small fraction of a horsepower to many thousands of horsepower, and in a wide range of speeds. The speed may be fixed or synchronous, constant for given load conditions, adjustable or variable. Many are self-starting and reversible.

Electric motors may either be of the alternating-current or direct-current variety. Although alternating-current motors are more common, direct-current motors are unexcelled for applications requiring simple, inexpensive speed control or sustained high torque under low-voltage conditions.

The construction and theory of operation of conventional electric motors are well known. In a conventional electric motor, a rotor is positioned within the motor housing and has a central shaft which is fixed at its ends in bearings retained within the housing. With this arrangement, electromagnetic interaction between the rotor and the stator positioned at the inside wall of the motor housing and surrounding the rotor causes the rotor to rotate about the central shaft.

While the conventional electric motor in use today certainly performs satisfactorily over a wide range of applications, it is not without problems. For example, the inefficiency inherent with motor stator end turns results in less than optimum motor horsepower to weight and motor horsepower to volume ratios. As a result, conventional electric motors must be physically sized larger than they would otherwise be if these ratios could be optimized.

Consequently, there is a need for an alternative design electric motor which optimizes these motor horsepower to weight and motor horsepower to volume design ratios and therefore may be used in applications in which horsepower, weight and volume considerations are all of critical importance.

SUMMARY OF THE INVENTION

The present invention is directed to a roller-type electric motor designed to satisfy the aforementioned need. The roller-type motor of the present invention has a construction which makes it particularly useful for high torque, low revolutions-per-minute applications. The speed reduction inherent in the motors' power removal scheme and the motor winding direction significantly improves its horsepower to weight and horsepower to volume ratios. The major difference between the electric motor of the present invention and a conventional electric motor is that the moving part of this electric motor, which would be considered the rotor of a conventional motor, does not rotate about a shaft centered in the cylinder formed by the stator and is not drawn to rotate past the poles of the stator by alternately switching the polarity of the poles of the stator. In the electric motor of the present invention, the rotor or moving part "rolls" on the inside of the stator, and its motion is like that of a barrel rolling inside of another barrel.

Accordingly, the present invention is directed to a roller-type electric motor which includes: (a) a housing having a hollow interior and an inner wall; (b) a first plurality of stator poles each of predetermined magnetic polarity and positioned at the inner wall of the housing; (c) a roller having an outer surface and positioned for rolling movement within the hollow interior of the housing; (d) a second plurality of roller poles each of predetermined magnetic polarity and positioned on the outer surface of the roller, one of the second plurality of roller poles having a magnetic polarity opposite the magnetic polarity of one of the first plurality of stator poles so that the first roller pole is drawn through magnetic action into contact with the first stator pole; and (e) a control device for reversing the magnetic polarity of the first stator pole when the first roller pole is in contact therewith to repel through magnetic action the first roller pole while simultaneously predetermined roller poles adjacent to the first roller pole are magnetically drawn towards predetermined stator poles adjacent to the first stator pole and thereby impart rolling movement to the roller within the housing.

These and other advantages and attainments of the present invention will become apparent to those skilled in the art upon a reading of the following detailed description when taken in conjunction with the drawing wherein there is shown and described illustrative embodiments of the invention.

BRIEF DESCRIPTION OF THE DRAWINGS

In the course of the following detailed description, reference will be made to the attached drawings in which.

DETAILED DESCRIPTION OF THE PREFERRED EMBODIMENT

Figure 1:
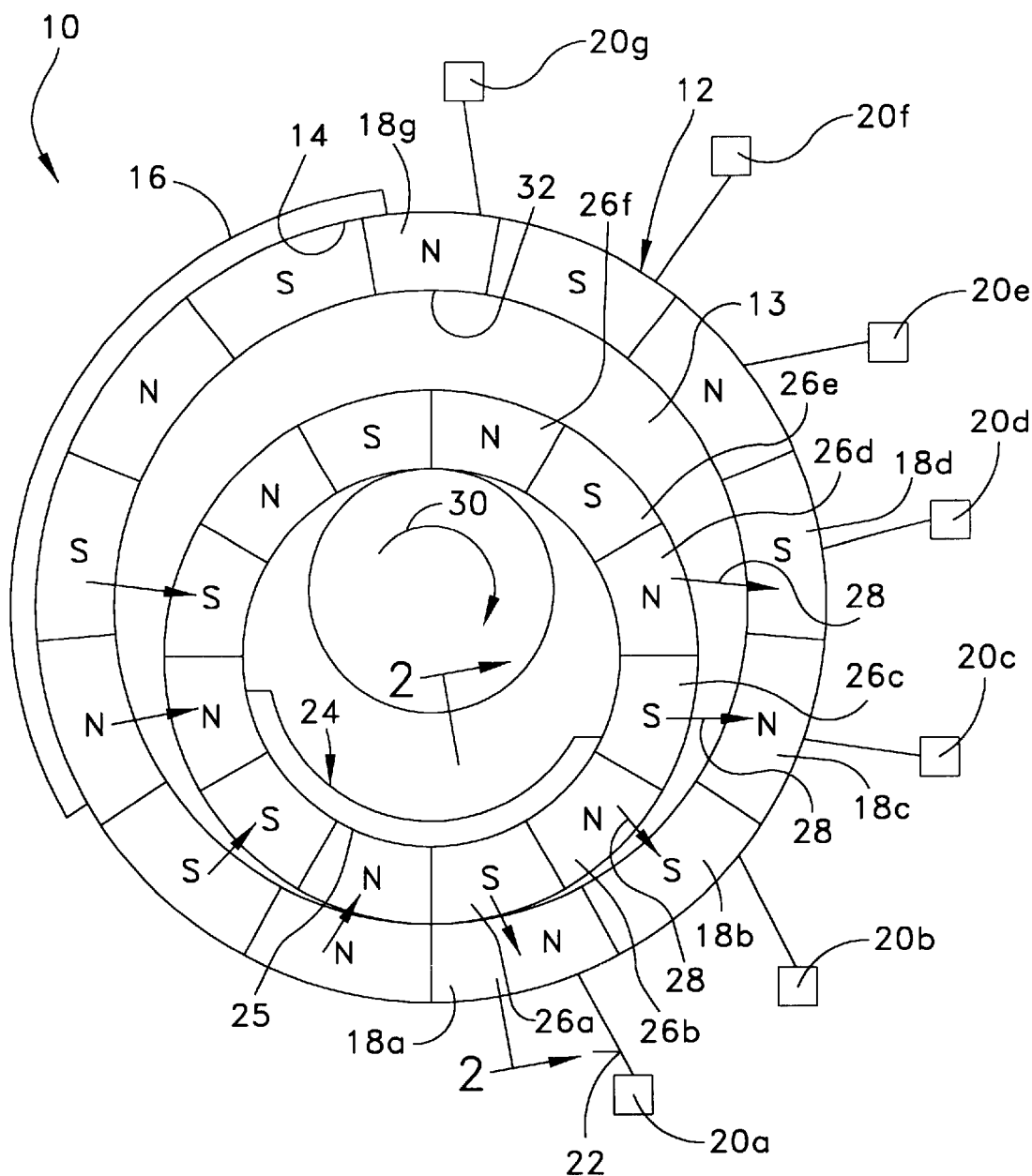
FIG. 1 is a partially schematic view in side elevation of the roller-type electric motor of the present invention, illustrating a roller having a plurality of permanent magnets positioned in circumferential fashion around its outer surface and positioned for rolling movement within a stator formed from a plurality of electromagnets whose polarities may be selectively reversed.

In the following description, like reference characters designate like or corresponding parts throughout the several views. Also in the following description, such terms as "forward", "rearward", "left", "right", "back" and the like, are words of convenience and are not to be construed as limiting terms.

Now referring to the drawings, and particularly to FIG. 1, there is illustrated a partial schematic view in side elevation of the roller-type motor of the present invention and generally designated by the numeral 10. The roller-type motor 10 of the present invention has a construction which simulates the high force generating capability of small gap solenoids oriented in a circumferential configuration to implement a high torque, low revolutions-per-minute rotating machine. As will be described herein, the speed reduction inherent in the power removal scheme and the winding direction, which does not require the inefficiency of stator end turns typical with conventional electric motors, provides significantly improved horsepower to weight and horsepower to volume ratios over conventional electric motors.

There are several major differences between the roller-type motor of the present invention and a conventional electric motor. The first difference is that the moving part of the motor of the present invention, which would be considered the rotor of a conventional motor, does not rotate about a shaft centered in the cylinder formed by the stator and is not drawn to rotate past the poles of the stator by alternately switching the polarities of the poles in the stator. The moving part of the motor of the present invention "rolls" on the inside of the stator. This motion is like a barrel rolling inside of a barrel. For this reason the moving part of this motor is more appropriately referred to as a "roller". The second difference between the motor of the present invention and a conventional electric motor is that the major working surfaces of the motor of the present invention are on the ends of the roller and the stator as opposed to being located along the longitudinal dimension of the rotor and the stator.

As seen in FIG. 1, the roller-type electric motor 10 includes a stator 12 positioned within the hollow interior 13 of and at the inside wall 14 of a housing 16. The stator 12 itself includes a plurality of stator poles, such as 18a, 18b, 18c, 18d, 18e, 18f and 18g. Each of the stator poles 18a, 18b, 18c, 18d, 18e, 18f and 18g is an alternating current electromagnet of predetermined electrical polarity at a given instant of time, and the plurality of stator poles 18 are positioned in cylindrical fashion around the inside wall 14. Control devices 20a, 20b, 20c, 20d, 20e, 20f and 20g in the form of reversible polarity power supplies or a combination of supplies and switching devices, or other suitable alternating-current devices are connected in a well known fashion to each of the stator poles (seven control devices 20a, 20b, 20c, 20d, 20e, 20f, and 20g shown in FIG. 1). Each of these control devices is operable to reverse the polarity of its output signal which is provided to an individual stator pole on input line 22. The polarity of the output signal is continuously reversed in cyclical fashion during operation of the motor 10, thereby causing the polarity of the stator pole which receives the input signal to continually oscillate between a positive and a negative magnetic polarity.

The roller-type electric motor 10 further includes a roller 24 having an outer surface 25 and positioned within the hollow interior 13 of the housing 16. A plurality of roller poles, such as, 26a, 26b, 26c, 26d, 26e, 26f and 26g are positioned in circumferential fashion around the outer surface 25 of the roller 24. Each of the roller poles is a permanent magnet, thus having a predetermined and fixed magnetic polarity. The plurality of roller poles such as 26a, 26b, 26c, 26d, 26e, 26f and 26g are arranged around the outer surface 25 of the roller 24 so that a roller pole of south magnetic polarity is interposed between a pair of roller poles 26 each of north magnetic polarity.

The roller-type electric motor 10 operates as follows. At a given instant of time, the roller 24 is positioned within the stator 12 as shown in FIG. 1. With the roller 24 in this position, a roller pole 26a of south magnetic polarity is touching a stator pole 18a of north magnetic polarity since the roller pole 26a is drawn through magnetic action into contact with the stator pole 18a. The magnetic action drawing these rotor and stator poles together is illustrated by the directional arrow 28. The roller poles adjacent to the roller pole 26a, namely the rotor poles 26b, 26c, 26d, 26e, 26f and 26g around the circumference of the roller 24, are also drawn through magnetic action towards the aligning stator poles 18b, 18c, 18d, 18e, 18f and 18g around the circumference of the stator 12. The individual roller poles are drawn in sequence into contact or "closure" with their aligning stator poles until direct alignment and contact occurs and then they are repelled from the aligning stator pole by reversing the polarity of the aligning stator pole. At this time the stator pole~180 degrees opposite the point of contact is also reversed thus attracting its counterpart roller pole. Thus as seen in FIG. 1, when the roller pole 26a is in direct contact and alignment with stator pole 18a, the electrical polarity of the output signal generated by the control devices 20a and 20g are reversed. This causes the magnetic polarity of the stator poles 18a and 18g to be reversed. When the magnetic polarity of the stator pole 18a is reversed, the roller pole 26a and stator pole 18a have the same magnetic polarity, causing the roller pole 26a to be repelled. When the magnetic polarity of the stator pole 18g is reversed, the roller pole 26g and stator pole 18g have opposite magnetic polarity, causing the roller pole 26g to be attracted to 18g.

As the roller pole 26a is being repelled and the roller pole 26g is being attracted, the remainder of the roller poles are being attracted to or repelled by their aligning stator poles as indicated by the directional arrows 28. This is particularly true of the roller poles 26b through 26d since they are all in relatively close proximity to their aligning stator poles 18b through 18d. The combination of the magnetic repulsion between the roller pole 26a and the stator pole 18a and the attraction between roller pole 26g and stator pole 18g added to the simultaneous attraction and repulsion of the other pole pieces as shown by the directional arrows 28 causes the roller to roll within the stator in a direction as indicated by the rotational arrow 30.

As described, the electrical polarity of each output signal provided to an individual stator pole 18 at a given instant of time results in the attracting or repelling force which is used to induce rolling motion of the roller 24 on the inside surface 32 of the stator 12. It is important to note that for the arrangement illustrated in FIG. 1, when the roller completes one roll around the inside surface 32 of the stator 12 it will actually turn one-thirteenth (1/13) of a revolution relative to the stator. Thus the roller 24 will make one revolution each time the roller 24 completes 13 rolls around the inside surface 32 of the stator 12. This is due to the difference in the number of roller and stator poles. In the motor 10 illustrated in FIG. 1, there are 12 roller poles and 13 stator poles. In general, the roller 24 will make one complete revolution for each n rolls or revolutions of the roller 24 within the stator 12, where n equals the number of stator poles 18 within the stator 12.

Figure 5:
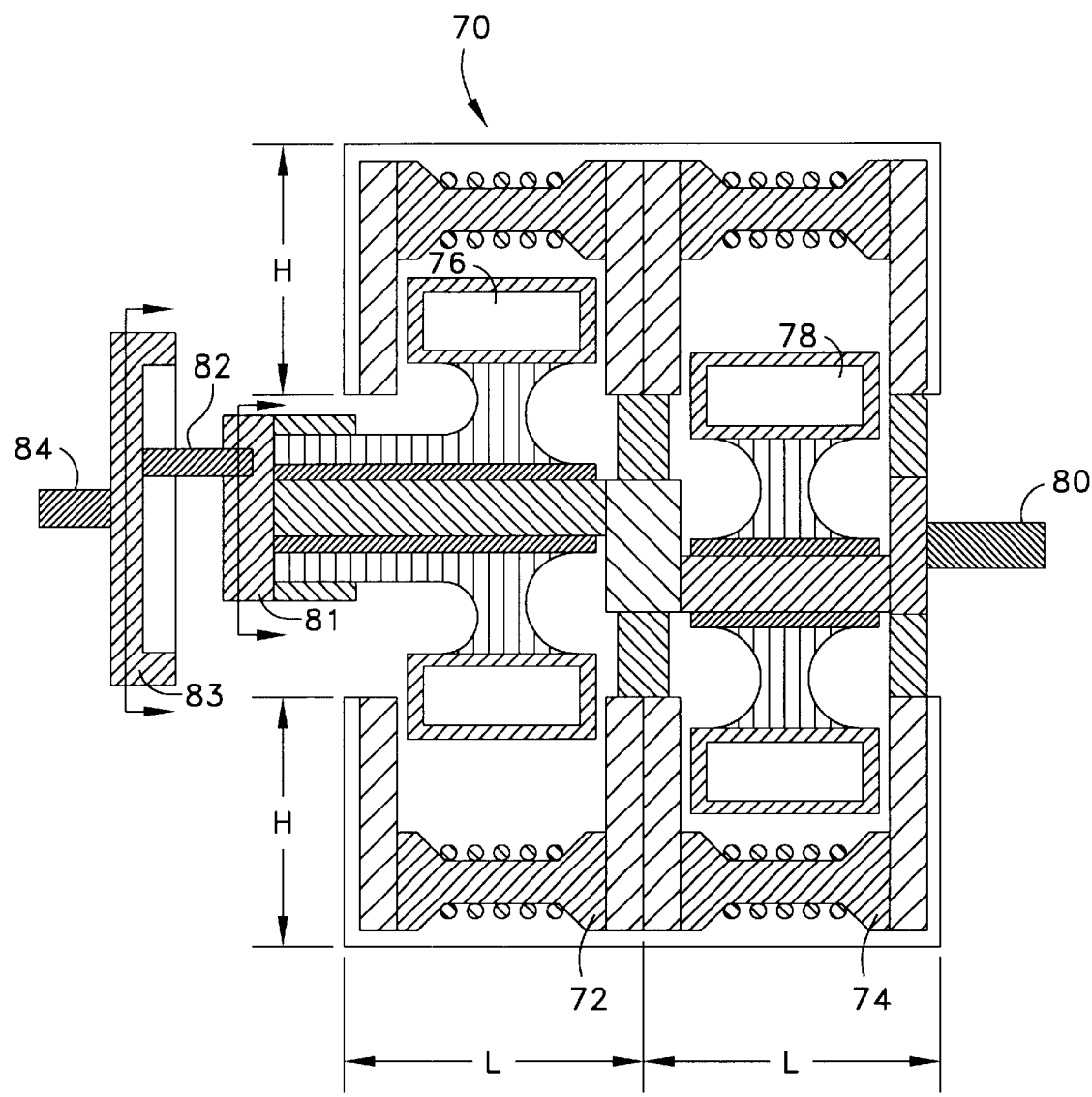
FIG. 5 is a cross-sectional view of another embodiment of the electric motor of the present invention.
Figure 6:
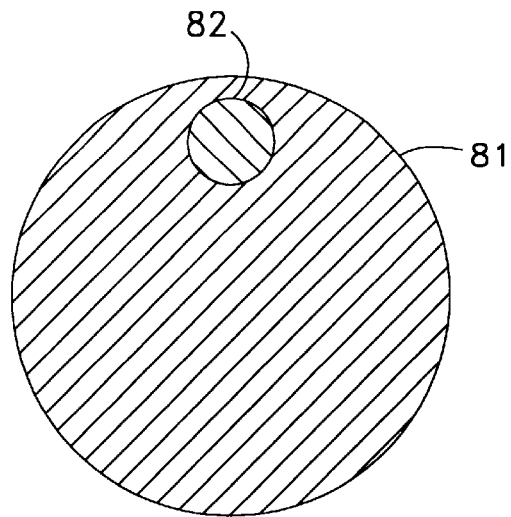
FIG. 6 is a cross section of the shaft end of the roller.
Figure 7:
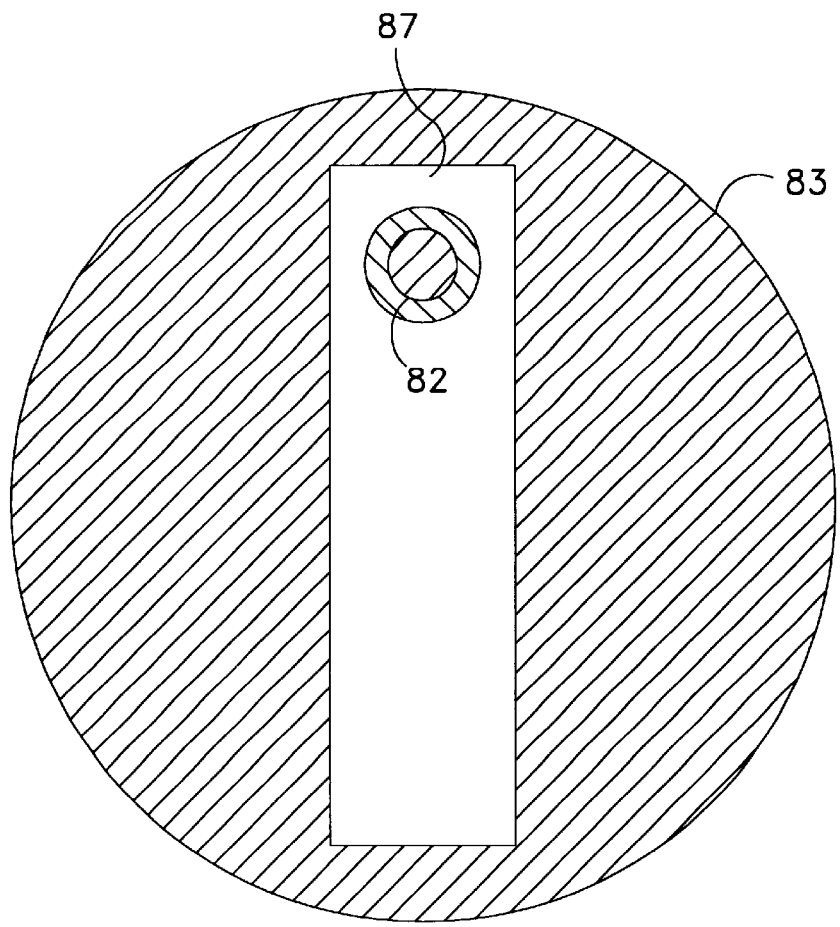
FIG. 7 is a cross section of roller plate.

Referring to FIG. 5 one embodiment of a power transfer mechanism is shown whereby the output shaft 84 rotates at the same rate as the roller. The pin 82 inserted in roller body 81 transfers force into the disk 83 attached to the end of the output shaft 84. FIGS. 6 and 7 show detail of the power transfer mechanism. The pins 85a and 85b of FIG. 6 rotate disc 86 of FIG. 7 by remaining aligned within the slot 87 of disc 86. There is also a high speed power output available at 80 of FIG. 5. Shaft 80 will rotate at the rate of roller progress, defined as n times the rotational speed of output 84 rolls around the inside surface 32 of the stator during operation of the motor 10. With this arrangement, the longitudinal movement of the roller 24 is confined so that the individual roller poles 26 positioned around the outer surface 25 of the roller 24 are in longitudinal alignment with the plurality of stator poles 18 positioned at the inside wall 14 of the housing 16.

Figure 2:
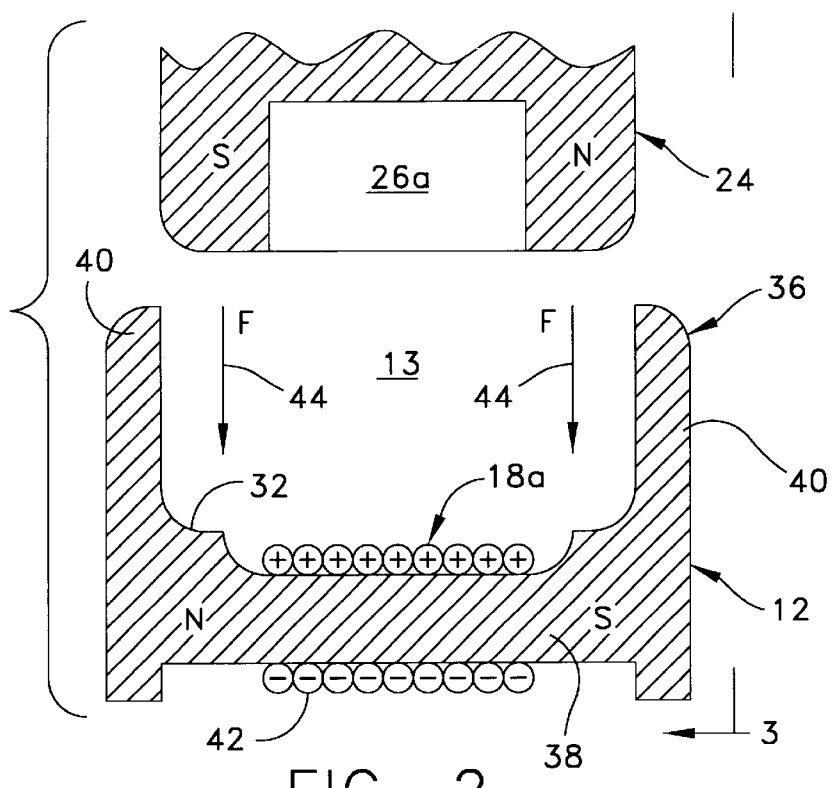
FIG. 2 is a cross-sectional view of a portion of the roller-type motor of the present invention taken along line 2—2 of FIG. 1, illustrating the construction of the roller and the stator wherein electrical windings are wrapped around the stator to form a stator pole.
Figure 3:
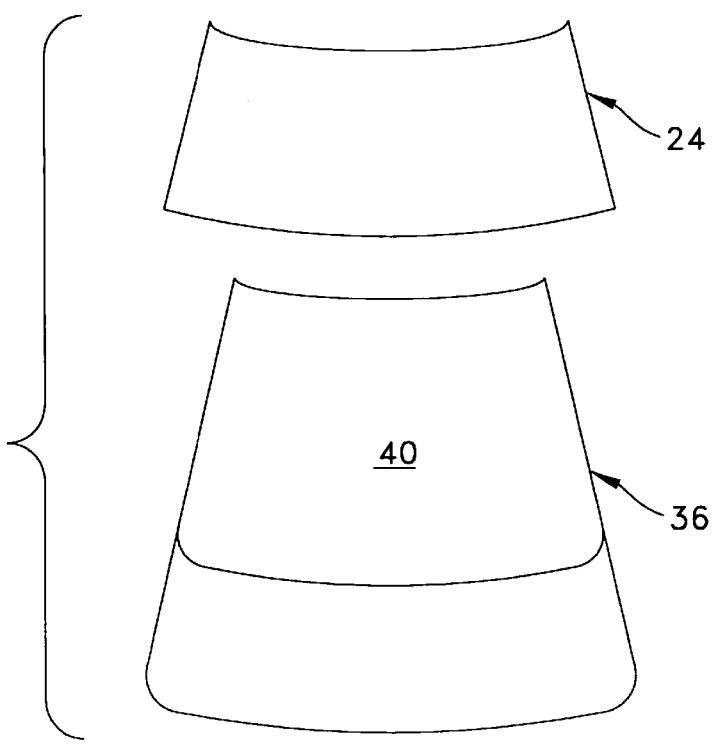
FIG. 3 is an end view of portions of the roller and the stator as taken along line 3—3 of FIG. 2.

The bottom wall 38 of the annular channel 36 at the location illustrated in FIG. 2 and the electrical winding 42 together define the stator pole 18a of FIG. 1. The electrical winding 42 is wound in a well known manner to provide that the magnetic field generated by the stator pole 18a either attracts or repels the permanent magnet roller pole 26a positioned within the roller 24. With the magnetic polarity of the stator pole 18a as shown in FIG. 2, the permanent magnet roller pole 26a is magnetically attracted to the stator pole 18 as indicated by the schematic force arrows 44. When the magnetic polarity of the stator pole 18a is reversed, the permanent magnet roller pole 26a is magnetically repelled away from the stator pole 18a. Because of the radial pole orientation in the roller-type motor 10, it is desirable to increase the magnetic area of a single roller in order to increase the attracting and repelling forces generated by operation of the motor 10. This is achieved by reducing the internal diameter of the roller 24 and increasing the area of the stator 12 end pole area. This is illustrated in FIG. 3.

In order to illustrate the advantages of the roller-type motor of the present invention over a conventional electric motor, reference will now be made to FIGS. 4 and 5.

Figure 4:
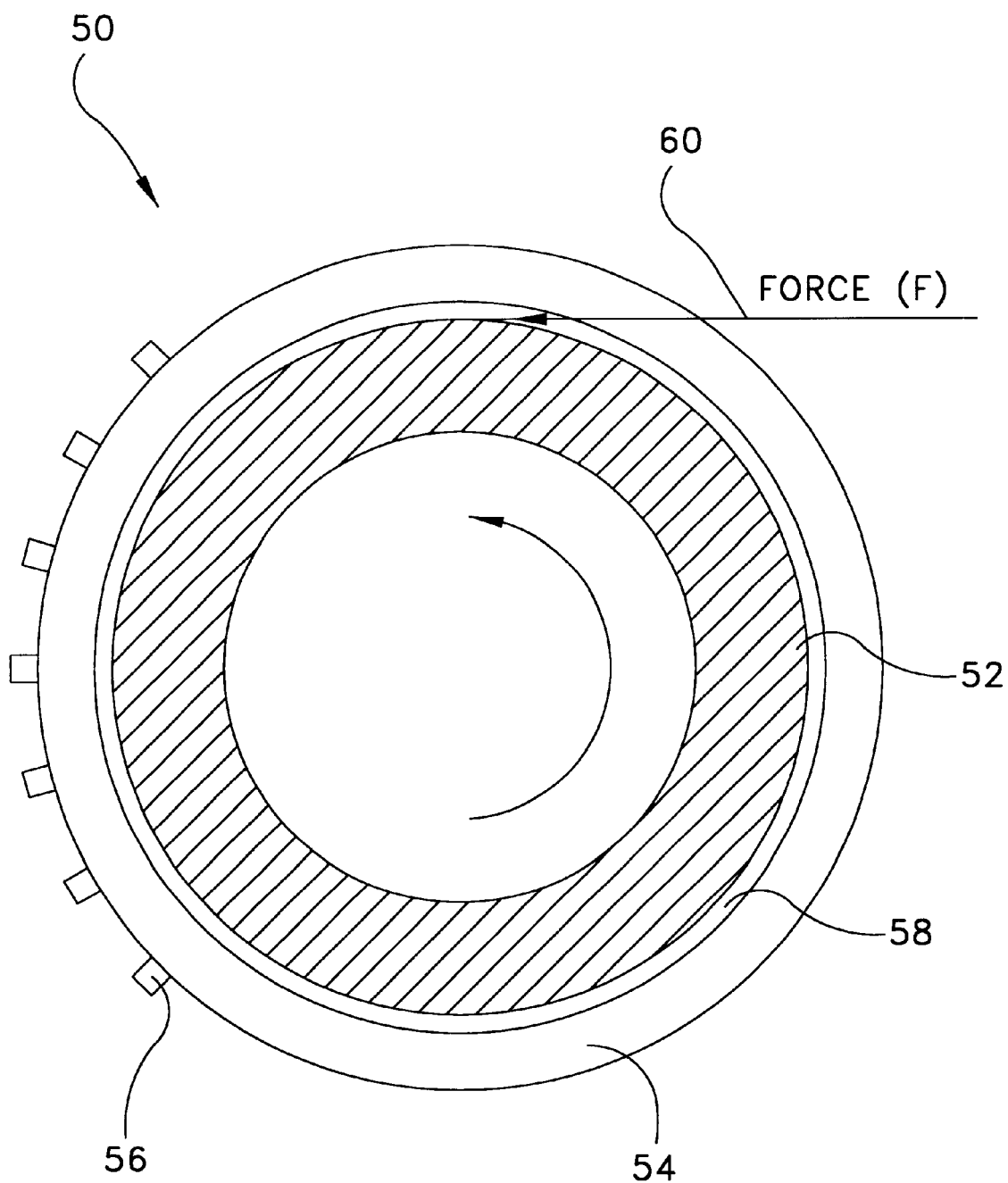
FIG. 4 is a schematic illustration of a conventional electric motor.

FIG. 4 is a schematic representation of a conventional rotating electric motor designated by the numeral 50. The electric motor 50 includes a rotor 52 and a stator 54 having thirty-six stator poles 56 (seven shown for illustrative purposes only). The construction and operation of the rotor 52 and the stator 54 are themselves well known in the art. In the conventional electric motor 50, the outside diameter of the rotor is 13.9 inches allowing a 0.050 clearance between the rotor 52 and the stator 54 for the air gap 58. In one revolution of the rotor 52, the forces generated by all thirty-six stator poles are applied over a distance equal to the rotor 52 circumference. These forces can be represented as a single force as illustrated schematically by the force arrow 60. These forces will be applied over a distance equal to the rotor circumference in one revolution of the rotor 52. The rotor circumference is calculated as:

Circumference=2π×radius=(2)(3.14)(6.95)=3.637 ft

The magnetic working area is the inside cylindrical surface of the stator minus that which is lost to winding slots. Since each slot in the motor of FIG. 4 has windings for two poles, each slot is 0.5 inch wide. Therefore, the surface area is calculated as:

Surface Area=2π×radius [length]−slot length [slot width]×number of slots

Surface Area=2(3.14)(7)(12)−36(12)(0.5)=311.5 sq.in.

Thus, the power generated by the conventional electric motor of FIG. 4 is calculated as:

$$\text{Power Out} = \text{Area}[F] \times \text{distance ft-lb/min}$$
$$= 311.5[F]3.637\,(400)/33000 HP$$
$$= 13.8\ F\ HP$$

Referring again to FIG. 5, there is illustrated an alternate embodiment of the roller-type electric motor 10 of FIG. 1. As seen in FIG. 5, the roller-type electric motor 70 includes a pair of stators 72, 74, and a pair of rollers 76, 78. Each of the pair of stators 72, 74 has a construction identical to the construction of the stator 12 of FIG. 1. In like fashion, each of the pair of rollers 76, 78 has a construction identical to the construction of the roller 24 of FIG. 1. The pair of rollers 76, 78 are connected via a crankshaft 80, and are angularly positioned relative to each other so that there is an 180 degree separation between them. Each of the rollers 76, 78 has 12 roller poles and has an outer diameter of eleven inches, an internal diameter of six inches and a length of five inches. The overall length L of each stator section is six inches, each stator winding area (area of each stator pole) will have a two inch radial thickness and an upstanding side wall height h of four and one-half inches. The magnetic working area of each stator pole is defined by the circular area of the stator's outside dimension minus the internal diameter and the radial winding areas of the thirteen poles. For the motor 70 of FIG. 5, one-quarter inch is assumed to be the winding radial dimension. This makes the stator outside diameter equal to seventeen and one-half inches and its inside diameter equal to fourteen and one-half inches. The magnetic working area of each roller is defined as the roller outside circular area minus the roller inside diameter circular area. Although the working surface is augmented by the cylindrical surfaces, this force is not included here and will compensate for the less that one hundred percent overlap of roller end and stator upstanding side wall. The working surface area of motor 70 is limited to whichever is smaller of the two.

FIGS. 6 and 7 illustrate the shaft end of the roller and a cross section of the roller plate.

The stator area is calculated as:

$$\text{Stator Area} = \pi\ \text{outside radius} - \pi\ \text{inside radius} -$$
$$13\ (\text{winding area})$$
$$= (3.14)(8.75)(8.75) - (3.14)(7.25)(7.25) - (13)(.5)(1.5)$$
$$= 240.4 - 165 - 9.75$$
$$= 65.7$$

The Roller Surface Area is calculated as:

$$\text{Roller Surface Area} = \pi\ \text{outside radius} - \pi\ \text{inside radius}$$
$$= (3.14)(5.5)(5.5) - (3.14)(3)(3)$$
$$= 95 - 28.3$$
$$= 66.7$$

Since the Stator Area is of smaller value than the Roller Surface Area, it will be used for these calculations. The Stator Area represents the area of one end of a stator and roller.

The Total Area is calculated as:

$$\text{Total Area} = 2 \times (\text{Surface Area}) \times \text{number of rollers}$$
$$= (2)(65.7)(2)$$
$$= 262.8 \text{ sq. in.}$$

The distance that this force will be applied to the roller for one output revolution is defined as:

$$\text{Roller Distance} = 2 \times \pi \times$$
$$(\text{Stator radius} - \text{Roller radius} - \text{Air gap}) \times 13$$
$$= 2(3.14)(1.45)(13)$$
$$= 118.4 \text{ in. or } 9.86 \text{ ft.}$$

The power generated by the rolling machine of FIG. 5 is calculated as:

$$\text{Power Out} = \text{Area} \times F \times \text{distance ft-lb/min}$$
$$= 262.8 \times F \times (9.86)(400)/33000 \; HP$$
$$= 31.4 \; F \; HP$$

In summary, the machine power of the roller-type electric motor of FIG. 5 equals 31.4 F horsepower and the machine power of the conventional electric motor of FIG. 4 is 13.8 F horsepower. Thus, the roller-type electric motor of FIG. 5 has a power increase over the conventional motor of FIG. 4 equal to 31.4/13.8=228 percent.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the forms hereinbefore described being merely preferred or exemplary embodiments thereof.

What is claimed is:

1. A roller-type electric motor, comprising:

a housing having a hollow interior and an inner wall;

a plurality of stator poles each of predetermined electrical polarity and positioned at said inner wall of said housing;

a roller having an outer surface and positioned for rolling movement within said hollow interior of said housing;

a plurality of roller poles each of predetermined magnetic polarity and positioned on said outer surface of said roller, a first one of said roller poles having a magnetic polarity opposite the magnetic polarity of a first one of said stator poles so that said first roller pole is drawn through magnetic action into contact with said first stator poles;

control means for reversing the magnetic polarity of said first stator pole when said first roller pole of opposite magnetic polarity is in contact therewith to repel through magnetic action said first roller pole while simultaneously predetermined roller poles adjacent to said first roller pole are magnetically drawn towards predetermined stator poles adjacent to said first stator pole to impact rolling movement to said roller within said housing, wherein said inner wall of said housing has a cylindrical configuration and furthermore said plurality of stator poles are positioned in circumferential fashion around said cylindrical inner wall of said housing, wherein each of said stator poles is an alternating current electromagnetic, and said plurality of stator poles are housed in said housing and positioned so as to define an annular channel; and said plurality of roller poles are positioned and are aligned with said channel so that said rolling movement of said roller is confined within said channel.

\* \* \* \* \*